(12) United States Patent
Peters, Jr. et al.

(10) Patent No.: US 7,330,483 B1
(45) Date of Patent: Feb. 12, 2008

(54) SESSION INITIATION PROTOCOL (SIP) MESSAGE INCORPORATING A MULTI-PURPOSE INTERNET MAIL EXTENSION (MIME) MEDIA TYPE FOR DESCRIBING THE CONTENT AND FORMAT OF INFORMATION INCLUDED IN THE SIP MESSAGE

(75) Inventors: Robert Y. Peters, Jr., Rumson, NJ (US); Harish Samarasinghe, Holmdel, NJ (US)

(73) Assignee: AT&T Corp., New York, NY (US)

( * ) Notice: Subject to any disclaimer, the term of this patent is extended or adjusted under 35 U.S.C. 154(b) by 1085 days.

(21) Appl. No.: 10/324,198

(22) Filed: Dec. 19, 2002

(51) Int. Cl.
G06F 15/173 (2006.01)
H04L 12/56 (2006.01)

(52) U.S. Cl. .................. 370/466; 370/503; 370/389; 370/395.65; 370/356; 709/224; 709/226; 709/227; 709/230; 455/502

(58) Field of Classification Search ........ 370/230–231, 370/295.2, 354–356, 389, 392, 395.21, 401, 370/409, 466; 709/200, 203, 249, 224–230, 709/206
See application file for complete search history.

(56) References Cited

U.S. PATENT DOCUMENTS

| | | | |
|---|---|---|---|
| 5,864,850 A | | 1/1999 | Nordman |
| 5,867,494 A * | | 2/1999 | Krishnaswamy et al. ... 370/352 |
| 6,256,389 B1 * | | 7/2001 | Dalrymple et al. ......... 370/352 |
| 6,401,099 B1 | | 6/2002 | Koppolu et al. |
| 6,459,774 B1 * | | 10/2002 | Ball et al. .................. 379/67.1 |
| 6,460,058 B2 | | 10/2002 | Koppolu et al. |
| 6,694,145 B2 * | | 2/2004 | Riikonen et al. ........... 455/502 |
| 6,826,272 B1 * | | 11/2004 | Dalrymple et al. ..... 379/220.01 |
| 6,865,681 B2 * | | 3/2005 | Nuutinen ..................... 726/14 |
| 6,910,068 B2 * | | 6/2005 | Zintel et al. ................ 709/220 |
| 6,937,597 B1 * | | 8/2005 | Rosenberg et al. ......... 370/356 |
| 6,976,094 B1 * | | 12/2005 | Dalrymple et al. ......... 709/248 |
| 7,050,423 B2 * | | 5/2006 | Schneider et al. .......... 370/352 |
| 7,145,898 B1 * | | 12/2006 | Elliott ........................ 370/352 |
| 7,180,984 B1 * | | 2/2007 | Samarasinghe .......... 379/88.13 |
| 7,240,366 B2 * | | 7/2007 | Buch et al. .................. 726/14 |
| 2001/0020243 A1 | | 9/2001 | Koppolu et al. |
| 2002/0082730 A1 | | 6/2002 | Capps et al. |
| 2002/0103824 A1 | | 8/2002 | Koppolu et al. |
| 2002/0103898 A1 * | | 8/2002 | Moyer et al. ................ 709/224 |
| 2002/0146005 A1 * | | 10/2002 | Gallant et al. .............. 370/389 |
| 2003/0123488 A1 * | | 7/2003 | Riikonen et al. ........... 370/503 |
| 2003/0217109 A1 * | | 11/2003 | Ordille et al. .............. 709/206 |
| 2003/0217165 A1 * | | 11/2003 | Buch et al. ................. 709/229 |
| 2004/0019633 A1 * | | 1/2004 | Scott et al. ................. 709/203 |

* cited by examiner

*Primary Examiner*—Edan Orgad
*Assistant Examiner*—Venkatesh Haliyur

(57) ABSTRACT

A system and method for processing a plurality of requests for multi-media services received at a call control element (CCE) defined on the system from a plurality of IP-communication devices. The system includes at least one Network Routing Element (NRE), a Service Broker (SB), a media sever, a plurality of application servers (ASs) and a plurality of border elements, all of which are coupled to the CCE. The CCE is adapted to receive requests for multi-media services and to generate subsequent requests for the multi-media services, which are communicated to the SB for processing. The subsequent requests can each include a Session Initiation Protocol (SIP) message including a message identifier portion having at least a first predetermined information field and a second predetermined information field. The message identifier portion of the SIP message declares the content and format of the SIP message to a recipient device defined on the system.

9 Claims, 3 Drawing Sheets

SESSION INITIATION PROTOCOL (SIP) MESSAGE INCORPORATING A MULTI-PURPOSE INTERNET MAIL EXTENSION (MIME) MEDIA TYPE FOR DESCRIBING THE CONTENT AND FORMAT OF INFORMATION INCLUDED IN THE SIP MESSAGE

FIELD OF THE INVENTION

The present invention relates generally to a SIP message including a MIME media type field and MIME media subtype field and, more specifically, to SIP message including a MIME media type field and MIME media subtype field that describes the content and format of information included in the SIP message, which can be communicated between core network elements defined on a multi-media service provider system.

BACKGROUND

Service providers, such as AT&T, can receive a number of requests from various users of communication devices for any one or more of a plurality of multi-media service offerings. These requests may be directed to a predetermined application server of a plurality of application servers associated with the service provider, which is adapted to provide feature processing for the requested multi-media service. As Service providers continue to add multi-media service offerings and corresponding application servers for providing feature processing for each of the requested multi-media services, there is a need for improving communications between core network elements defined on the service provider system to permit more efficient and accurate processing of user requests for multi-media services.

SUMMARY OF THE INVENTION

A system for processing multi-media service requests to form a multi-media communication path between at least a first communication device and at least a second communication device of a plurality of communication devices. The system includes a call control element that is adapted to receive at least a first request message for at least one multi-media service from the first communication device. The call control element is further adapted to process the first request message to generate a second request message for the at least one multi-media service. The second request includes a message identifier portion, which has at least a first predetermined information field and a second predetermined information field. The message identifier portion of the second request message enables a recipient network element to identify the format and content of the second request message in relation to advanced intelligent services. The recipient network element can include a number of elements included on the system, such as one or more application servers or border elements.

In one aspect, the message identifier portion can include a Content-Type header portion. Further, the first predetermined information field of the Content-Type header portion can include a Multi-Purpose Internet Mail Extension (MIME) Media Type field and the second predetermined information field of the Content-Type header portion can include a MIME Media Subtype field.

In another aspect, the Content-Type header portion can include the parameters: Content-Type: application/vnd.att-advanced-intelligent-services; boundary="- -att-advanced services- -." In another aspect, the Content-Type header portion can include the parameters: Content-Type: application/vnd.att-advanced-intelligent-services; charset=US-ASCII; boundary="- -att-advanced-services- -".

In another aspect, the MIME Media Type field can include the parameters: application/sdp. Alternatively, the MIME Media Type field can include the parameters: vnd.att-application/advanced-intelligent-features. In one aspect, the MIME Media Subtype field can include the parameters: vnd.att-advanced-intelligent-features.

In another aspect of the present invention, a Session Initiation Protocol (SIP) message is set forth, which includes a Content-Type portion having a MIME Media Type field and a MIME Media Subtype field. The MIME Media Type field declares a data type associated with the SIP message. The MIME Media Subtype field specifies a format for the data type that allows a predetermined recipient network element, which receives the SIP message, to identify the format and content of the SIP message in relation to advanced intelligent services. The SIP message can include at least one of a SIP Redirect message, a SIP INFO message, a SIP UPDATE message or a SIP BYE message.

In another aspect of the present invention, a method of processing multi-media service requests received at a multi-media services provider system is set forth to form a multi-media communication path between at least a first communication device and at least a second communication device of a plurality of communication devices. The method includes receiving at least a first request message for at least one multi-media service at a call control element located on the multi-media services provider system. The first request message is processed at the call control element for generating a second request message for the at least one multi-media service. The second request message includes a message content identifier portion having at least a first predetermined information field and a second predetermined information field.

In one aspect, the method further includes processing the second request message at a service broker element located on the multi-media services provider system to identify a format and content of the second request message. For example, identifying the format and content of the second request message includes identifying advanced intelligent services requested by the second request message.

In another aspect, the method includes receiving the first request message for the at least one multi-media service at an application server located on the multi-media services provider system. The first request message is processed at the application server to identify advanced intelligent services associated with the first request message.

In another aspect, generating the second request message at the call control element, which includes the message content identifier portion, includes generating a Session Initiation Protocol (SIP) INVITE message and including a Content-Type field.

BRIEF DESCRIPTION OF THE DRAWING

The foregoing and other objects of this invention, the various features thereof, as well as the invention itself, can be more fully understood from the following description, when read together with the accompanying drawings in which.

DETAILED DESCRIPTION OF THE INVENTION

Figure 1:
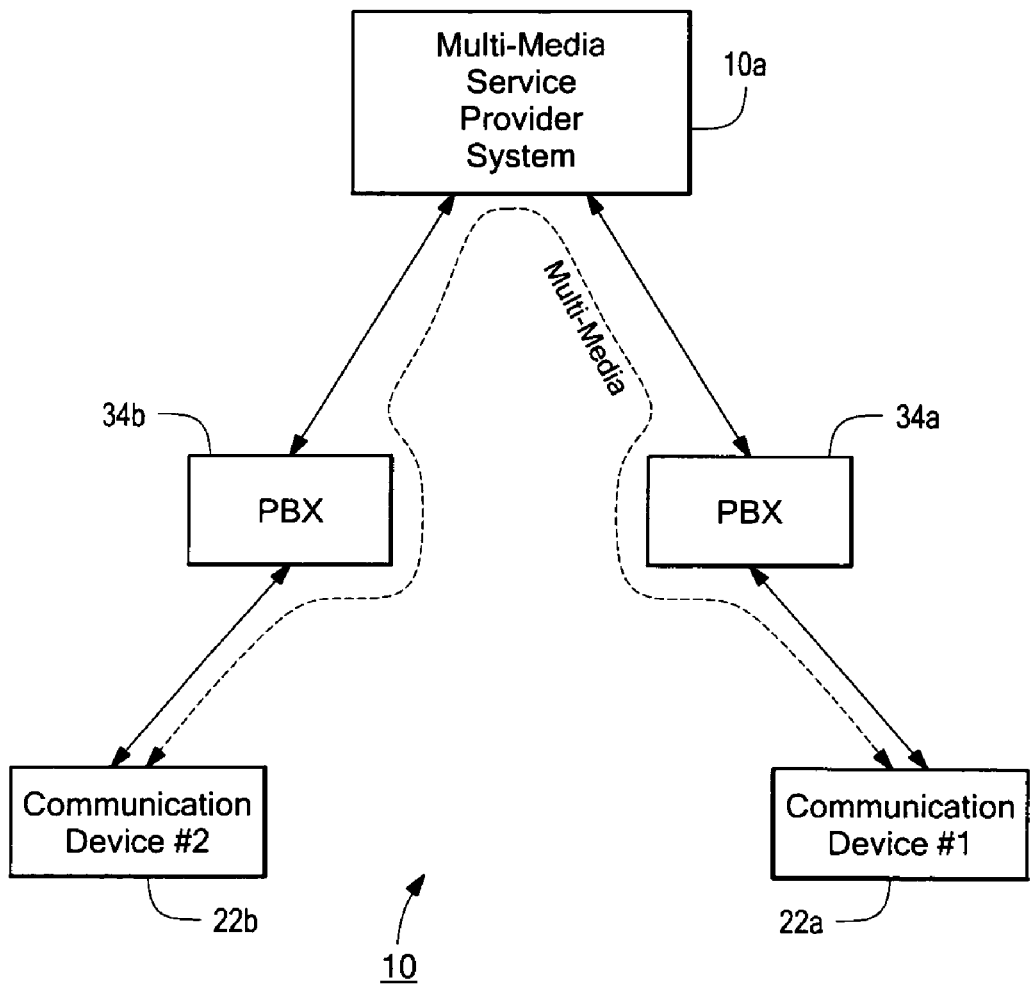
FIG. 1 is an exemplary high-level schematic block diagram of a system for providing multi-media communications between a plurality of communication devices according to the present invention.

FIG. 1 shows one embodiment of a communication network 10 for providing multi-media communications between at least first 22a and second 22b communication devices of a plurality of communication devices, in accordance with the present invention. The communication network 10 includes a multi-media provider system 10a, which is operative to provide a plurality of multi-media services to the first 22a and second 22b communication devices, via respective first 34a and second 34b SIP-enabled IP-Private Branch Exchanges (hereinafter referred to as "PBXs"). It should be understood that the multi-media services provider system 10a is additionally operative to provide a plurality of multi-media services to a plurality of other communication devices not specifically shown herein.

Figure 2:
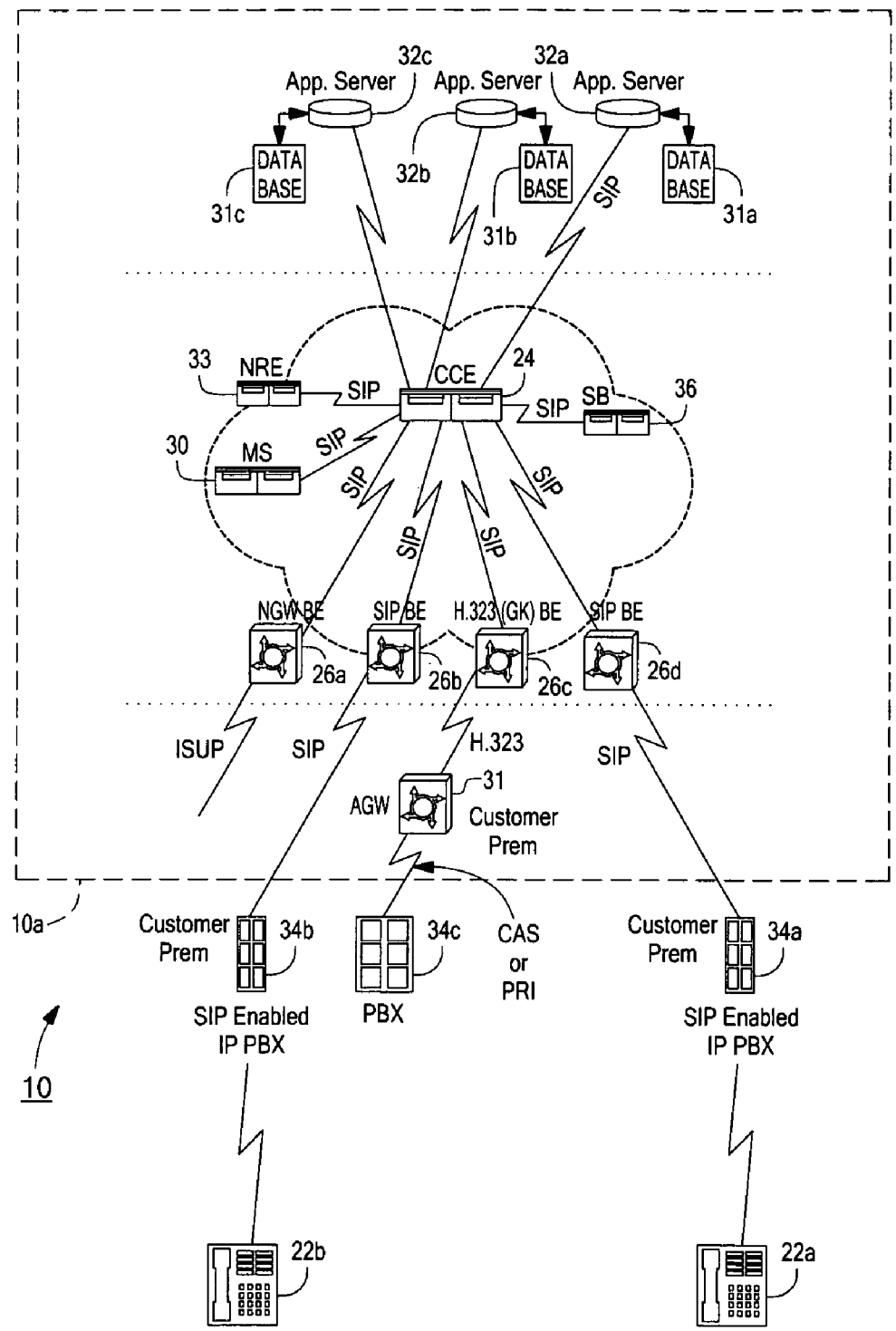
FIG. 2 is an expanded schematic block diagram of the system shown in FIG. 1.

Referring to FIG. 2, in the exemplary embodiment, the multi-media services provider system 10a includes a centrally located Call Control Element 24 (CCE), at least one Media Server (MS) 30, a plurality of Application Servers (ASs) 32a, 32b, 32c (collectively referred to hereinafter as ASs 32a-32b), at least one Network Routing Engine (NRE) 33, at least one Service Broker (SB) 36 and a plurality of Border Elements (BEs) 26a, 26b, 26c, 26d (collectively referred to hereinafter as BEs 26a-26d). The CCE 24 is coupled to the plurality of ASs 32a-32c and to the plurality of BEs 26a-26d. The CCE is further coupled to the MS 30, the NRE 33 and the SB 36. Although not shown, the BEs 26a-26d can also be coupled directly to one or more of the ASs 32a-32b.

In the exemplary embodiment, the BE 26d is coupled to the first PBX 34a and the BE 26b is coupled to the second PBX 34b. Further, the BE 26c is coupled to PBX 34c, via an access gateway 31, and is adapted for operation using an H.323 format. It should be understood that the BEs 26a-26d can be coupled to a plurality of other PBXs (not shown), which are included in other embodiments not specifically shown herein.

In the exemplary embodiment, the first PBX 34a is coupled to the first communication device 22a. Further, the second PBX 34b is similarly coupled to the second communication device 22b.

The CCE 24, for example, can be provided by Lucent Corporation of Murray Hill, N.J. The CCE 24 may be defined as a back-to-back user agent (B2BUA), which operates to receive a plurality of INVITE messages from any one of the plurality of BEs 26a-26d and upon receipt of the plurality of INVITE messages from the BEs 26a-26d, the CCE 24 can initiate an equal plurality of INVITE messages to the SB 36. The CCE 24 is further adapted to receive a plurality of Redirect messages from the SB 36 in response to the plurality of INVITE messages sent to the SB 36 from the CCE 24. When the CCE 24 receives a Redirect message back from the SB 36 in response to an INVITE message and depending on instructions provided by the SB 36 in the Redirect message, the CCE 24 can either send an INVITE message to one or more of the plurality of ASs 32a-32c for feature processing for the call or the CCE 24 can send an INVITE message to the NRE 33 (i.e. feature processing is not required for the call) to bypass the plurality of ASs 32a-32c and set up the call. The CCE 24 is further adapted to maintain the call state between the first 22a and the second 22b communication devices and to generate a call detail record (CDR) based on instructions received from any one or more of the plurality of ASs 32a-32c.

In the exemplary embodiment, the BEs 26a-26d can be provided by Lucent Corporation of Murray Hill, N.J. In one embodiment, the BEs 26a-26d are adapted to use SIP as the signaling protocol for interfacing with the CCE 24. Further BE 26a is adapted to interface to a circuit network (not shown) using an ISDN user port included thereon. The BEs 26b and 26d are adapted to use SIP as the signaling protocol for interfacing with the first 34a and second 34b PBXs. The BE 26c is adapted to use H.323 as the signaling protocol for interfacing with the PBX 34c, via the Access Gateway (AGW) 31. In the exemplary embodiment, the BEs 26a-26d may be thought of as a SIP B2BUA because each of the BEs 26a-26d generates SIP messages as well as receives requests from SIP endpoints, such as the SIP-enabled first 34a and second 34b PBXs, and either processes the requests itself or forwards the requests to the CCE 24 for processing. In another embodiment, the BEs 26a-26d are adapted to use SIP as the signaling protocol for interfacing with the AS 32a-32c when (1) supporting Stimulus Signaling (See: "A Framework for Stimulus Signaling in SIP Using Markup", J. Rosenberg. IETF draft April 24-2002, the subject matter of which is herein incorporated by reference in its entirety), or (2) supporting communication for services like Click-to-Dial.

In the exemplary embodiment, the SB 36 can also be provided by Lucent Corporation of Murray Hill, N.J. In one embodiment, the SB 36 acts as the SIP Redirect Server. The SB 36 operates to identify a particular service request, which is included in the INVITE message received at the SB 36 from the CCE 24. The SB further operates to instruct the CCE 24, via a Redirect message, to redirect the call to one or more of the plurality of ASs 32a-32c for service processing. In an embodiment, the SB 36 can identify a particular service requested by the call based on ANI or DN information included in the INVITE message received at the SB 36 from the CCE 24. In addition, the SB 36 may perform call screening based on the Charge Party Station Type (a.k.a. OLI-Originating Line Information) received in the INVITE message at the SB 36.

After the SB 36 determines a primary AS 32a, 32b or 32c for processing a particular call request (as well as a secondary AS 32a, 32b or 32c for processing the particular call request), the SB 36 generates a SIP Redirect "300 Multiple Choice" message and populates the IP address/Port number combinations of the (primary/secondary) AS 32a, 32b or 32c in the Contact headers of the "300 Multiple Choice" message, and sends it to the CCE 24. This approach permits the CCE 24 to query the secondary AS 32a, 32b or 32c in the event that the primary AS 32a, 32b or 32c is overloaded or not available to process the call request.

In the exemplary embodiment, the plurality of ASs 32a-32c can each include a conventional computer server, such as an "NT-Server," which can be provided by Microsoft of Richmond, Wash. or a "Unix Solaris Server," which can be provided by Sun Micro Systems of Palo Alto, Calif. The ASs 32a-32c can be programmed with conventional Web-page interface software such as: "Visual Basic," "Java," "JavaScript," "HTML/DHTML," "C++," "J+," "Perl," or "Perlscript," and "ASP." The ASs 32a-32c can each further be programmed with an operating system, Web server software and Web Application software, such as an e-commerce application and computer network interface software. In addition, the ASs 32a-32c can each be programmed with multi-media service software adapted to provide a plurality of multi-media services, as is known, such as "Click-to-Dial," "Video Conferencing," "Virtual Private Networks," and "Toll-Free Calling or 800-Service."

The ASs 32a-32c can each be further respectively coupled to databases 31a-31c, which each contain a service intelligence layer adapted for providing the plurality of multi-media services described above. The intelligence layer may include customer logic and data, as well as common logic and data that is used by communication devices 22a, 22b, as well as a plurality of other communication devices not specifically shown in FIG. 2.

The NRE 33 also operates as a SIP Redirect Server. The NRE 33 processes INVITE messages received from the CCE 24; performs address resolution based on the routing number returned from the AS 32a-32c and generates a Redirect "300 Multiple Choice" message. The NRE 33 populates Redirect 300 Multiple Choice message with the IP addresses of one or more destination BEs 26a-26d and sends the Redirect 300 Multiple Choice message to the CCE 24. In an embodiment, the NRE 33 can send the Redirect 300 Multiple Choice message to the CCE 24 with a predetermined hierarchical list of IP addresses corresponding to a predetermined hierarchical order of BEs 26a-26d for processing the call. In this arrangement, a highest level BE 26a, 26b, 26c or 26d defined on the list can receive and process the call and if the highest level BE 26a, 26b, 26c or 26d is unable to process the call or has insufficient resources to do so, the call may be redirected by the CCE 24 to a next successive BE 26a, 26b, 26c or 26d defined on the hierarchical list.

The first 22a and second 22b communication devices can include a plurality of SIP-enabled devices, such as telephones, personal computers and IP-Private Branch Exchanges ("PBXs"). In addition, the first 22a and second 22b communication devices can include a plurality of SIP-enabled wireless devices, such as cellular telephones, pagers and personal digital assistants ("PDAs").

The MS 30, in the exemplary embodiment, is operative to provide a plurality of predetermined announcements to the communication devices 22a, 22b and to collect information from the communication devices 22a, 22b (e.g. caller-entered data). For example, if the caller is required to enter digits or a phrase for a Call Prompter service or SDN (Software Defined Network) service, the MS 30 will play the announcement prompting the caller to enter the required information. The MS 30 also collects the information entered by the caller. The MS 30 plays the announcements to the caller based on the instructions and announcement ID provided in the second INVITE message. In one embodiment, the announcements can include "Service Terminating" announcements or announcements for the caller to enter an authorization code, account code, or "call-prompter" digits.

Figure 3:
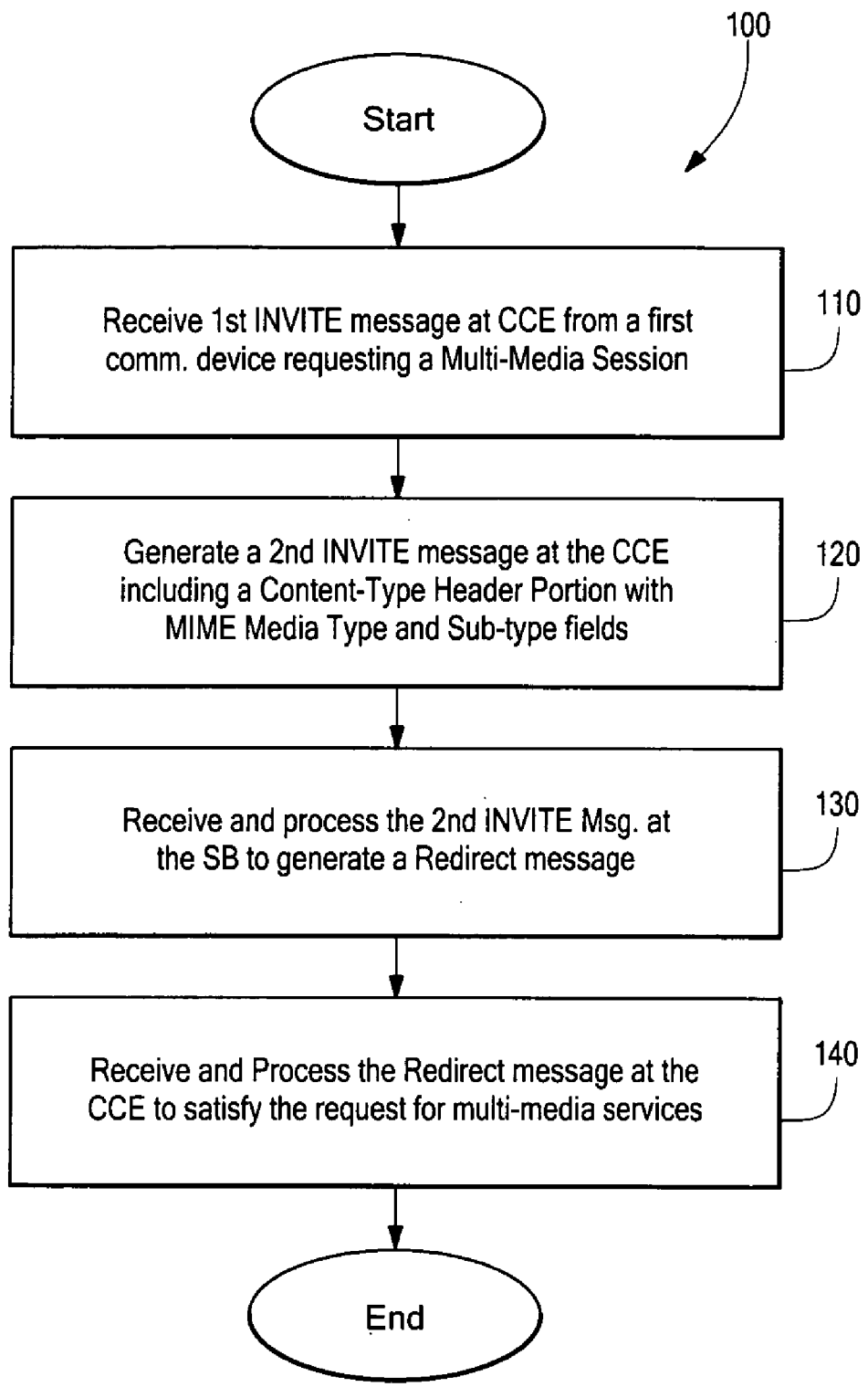
FIG. 3 is a high level flow chart illustrating process steps executable on the system of FIG. 2.

Referring now to FIG. 3, which shows an exemplary call flow 100 for processing requests for multi-media services that are received at the CCE from the first 22a and/or second 22b communication devices. At step 110, the CCE receives a first request for a multi-media service from the first 22a and/or second 22b communication device. At step 120, upon receiving the first request message for the multi-media service, the CCE generates a second request message including attributes of the first request message, which is communicated to the SB 36 for processing.

In the exemplary embodiment, the second request message includes an INVITE message having a Content-Type header portion. The Content-Type header portion includes a Multi-Purpose Internet Mail Extension (MIME) media type field and a MIME media subtype field. The Content-Type header portion of the INVITE message describes the content and format of the information included in the INVITE message. In an embodiment, the Content-Type header portion includes a MIME media type field having the parameter "application" and a MIME media subtype field having the parameters "vnd.att-advanced-intelligent-features." These MIME media type and subtype fields provide support for advanced intelligent services such as Toll-Free and Software Defined Network among others. In the exemplary embodiment, the INVITE message can include the following information:

INVITE    sip:7324204734@sdnas.att.com;user=phone SIP/2.0
Via: SIP/2.0/UDP ccenj.att.com:5060
Max-Forwards: 20
From: sip:7324204699@att.com
To: <sip:7324204734@att.com>
Call-ID: c39h4563-d119a-2995c2e322238@att.com
CSeq: 100 INVITE
Accept: application/vnd.att-advanced-intelligent-services
Contact: sip:7324204699@mypc.att.com:5060
Content-Type:  application/vnd.att-advanced-intelligent-services; boundary="- - att advanced services - -"
Content-Disposition: session
Content-Length: nnn
- - att advanced services
BEID=be.mtnj.1234
CN=7324204699;3;1
L=222
C=0288;0
CPN=7324204699;3;1;0;3
CPST=3
CA=7324204734;3;1
- - att advanced services - - where, the media type parameters of the INVITE message include:
Media Type name: application
Media Subtype name: advanced-intelligence-features
Required parameters: none
Optional parameters: none
Encoding scheme: US-ASCII Using the above-described media type parameters of the INVITE message, the Content-Type header portion for handling the advanced service of SDN would be as follows: Content-Type: application/vnd.att-advanced-intelligent-services; charset=US-ASCII; boundary=att-advanced-services. The Content-Type header operates to describe the data contained in the body of the message so that the receiving user-agent, such as the SB 36, can identify the contents of the message body and process the contents appropriately. The MIME media type field declares the general data type while the MIME media subtype field specifies the specific format for the data type. For example, the MIME media type field of the Content-Type header may include "application/sdp," which identifies the message body as containing information about the Session Description Protocol (SDP), so that an SDP session may be established between the CCE 24 and the SB 36, for example.

Further, the MIME media subtype field of the Content-Type header portion includes the values of "vnd.att-advanced-intelligence-features," which immediately follows the MIME media type field (e.g application) of the Content-Type header. The MIME media subtype field identifies the format and content of the body portion of the SIP messages as containing parameters for advanced service applications.

At step 130, the SB 36 receives the INVITE message having the Content-Type header portion, which includes the MIME media subtype field containing the value of vnd.att-advanced-intelligence-features. Further, the SB 36 processes the INVITE message to generate a Redirect message, which is communicated back to the CCE 24. Based on the call request related parameters received in the message body portion of the INVITE message, the SB 36 executes predetermined operations to generate the Redirect message.

At step 140, the CCE 24 receives and processes the Redirect message by generating a third request message. The third request message can be communicated to one or more of the ASs 32a-32c for multi-media feature processing. After completion of the multi-media feature processing, the one or more ASs 32a-32c can communicate with the NRE 33, via the CCE 24, for forming a communication path between a calling communication device, such as the first communication device 22a, and a called communication device, such as the second communication device 22b. If the CCE 24 determines that multi-media feature processing is not required, the CCE 24 can bypass the ASs 32a-32c and communicate the third request message directly to the NRE 33 for forming the communication path as described above.

It should be understood that the MIME media subtype field of the Content-Type portion, which includes the values of "vnd.att-.advanced-intelligence-features," may be incorporated into a number of other SIP messages, such as Redirect messages, INFO messages and UPDATE messages. It should be further understood that any one of the SIP messages, which include the MIME media subtype field, can be communicated between any two or more of the network elements defined on the multi-media services provider system 10a.

Information contained in the body portion of the INVITE message (or any other SIP message incorporating the MIME media subtype field) is identified by the MIME media subtype field having the values "vnd.att-advanced-intelligence-features," and is demarcated by a unique boundary. For example, the Content-Type header defined by the values or parameters: application/vnd.att-advanced-intelligent-services, includes a unique boundary specified as: --att-advanced-services--. Information contained in the body portion of the INVITE message (or any other SIP message incorporating the MIME media subtype field), which is identified by the MIME media subtype field having the values or parameters: vnd.att-advanced-intelligence-features, may include sensitive network and/or customer information. Therefore, during processing of the information contained in the body portion of the INVITE message at the CCE 24, for example, the CCE 24 may suppress predetermined parameters of the body portion of the INVITE message for security reasons. For example, if the CCE 24 terminates an INVITE message to a Border Element 26a-26d (as opposed to the SB 36) that connects to a customer premise device, the CCE 24 may suppress parameters like the Charge Number and Calling Party Station Type. Other parameters like the Calling Party Address may also be suppress based on input of the originating user. Note that the security considerations mentioned above are in addition to the encryption and authentication schemes that SIP provides as a standard part of the protocol.

The Content-Type header having the values of "application/vnd.att-advanced-intelligent-services" can be used in a multi-part message body where two or more different Content-Types comprise the body. For example, a SIP INVITE message body may have a Content-Type: application/SDP and a Content-Type: application/vnd.att-advanced-intelligent-services.

While various features of the present invention are described herein in conjunction with exemplary embodiments having various components using a number of protocols, it should be understood that other suitable components and protocols can be used without departing from the present invention.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto. All references and publications cited herein are expressly incorporated herein by reference in their entirety.

What is claimed is:

1. A method of processing multi-media service requests received at a multi-media services provider system to form a multi-media communication path between at least a first communication device and at least a second communication device of a plurality of communication devices, the method comprising:

receiving at least a first request message for at least one multi-media service at a call control element located on the multi-media services provider system;

processing the first request message at the call control element for generating a second request message for the at least one multi-media service and including a message content identifier portion having at least a first predetermined information field and a second predetermined information field, wherein generating the second request message and including the message content identifier portion includes generating a Session Initiation Protocol (SIP) INVITE message and including a Content-Type field; and processing the second request message at a service broker element located on the multi-media services provider system for identifying a format and content of the second request message.

2. A system for processing multi-media service requests to form a multi-media communication path between at least a first communication device and at least a second communication device of a plurality of communication devices, the system comprising:

a call control element located on the system and being adapted to receive at least a first request message for at least one multi-media service from the first communication device and to process the first request message to generate a second request message for the at least one multi-media service, wherein the second request includes a message identifier portion having at least a first predetermined information field and a second predetermined information field, wherein the first predetermined information field includes a Multi-Purpose Internet Mail Extension (MIME) Media Type field; and a service broker element located on the system and being adapted to receive and process the second request message to identify a format and content of the second request message.

3. The system for processing multi-media service requests of claim 2, wherein the MIME Media Type field includes the parameters: application/sdp.

4. The system for processing multi-media service requests of claim 2, wherein the MIME Media Type field includes the parameters: application/vnd.att-advanced-intelligent-features.

5. A computer-readable medium having stored thereon a plurality of instructions, the plurality of instructions including instructions which, when executed by a processor, cause the processor to perform the steps of a method for processing multi-media service requests to form a multi-media communication path between at least a first communication device and at least a second communication device of a plurality of communication devices, comprising:

receiving at least a first request message for at least one multi-media service at a call control element located on the multi-media services provider system;

processing the first request message at the call control element for generating a Session Initiation Protocol (SIP) message for the at least one multi-media service and including a Content-Type portion having a Multi-Purpose Internet Mail Extension (MIME) Media Type field and a MIME Media Subtype field, wherein the MIME Media Type field declares a data type associated with the SIP message and wherein the MIME Media Subtype field specifies a format for the data type that allows a predetermined network element to identify the format and content of the SIP message in relation to advanced intelligent services; and processing the SIP message at a service broker element located on the multi-media services provider system for identifying a format and content of the SIP message.

6. The computer readable medium of claim 5, further including:

generating a SIP Redirect message.

7. The computer readable medium of claim 5, further including:

generating a SIP INFO message.

8. The computer readable medium of claim 5, further including:

generating a SIP UPDATE message.

9. The computer readable medium of claim 5, further including:

generating a SIP BYE message.

\* \* \* \* \*